United States Patent [19]
Danielson et al.

[11] Patent Number: 5,256,602
[45] Date of Patent: Oct. 26, 1993

[54] FOREHEARTH COLORANT

[75] Inventors: Paul S. Danielson; Sheryl L. Hultman, both of Corning, N.Y.

[73] Assignee: Corning Incorporated, Corning, N.Y.

[21] Appl. No.: 910,538

[22] Filed: Jul. 8, 1992

[51] Int. Cl.$^5$ .......................... C03C 6/08; C03C 10/14
[52] U.S. Cl. ............................................ 501/17; 501/4;
501/29; 106/600; 106/608; 65/33
[58] Field of Search ................. 501/17, 29, 4, 69;
106/600, 608; 65/33

[56] References Cited

U.S. PATENT DOCUMENTS

| | | | |
|---|---|---|---|
| 2,920,971 | 1/1960 | Stookey | 106/39 |
| 3,408,212 | 10/1968 | Dumesnil | 106/47 |
| 3,663,245 | 5/1972 | Bryson | 106/52 |
| 3,932,312 | 1/1976 | Kazmierowicz | 501/17 X |
| 3,951,667 | 4/1976 | Kogure et al. | 106/623 X |
| 4,211,820 | 7/1980 | Cantaloupe et al. | 428/410 |
| 5,070,045 | 12/1991 | Comte et al. | 501/4 |

*Primary Examiner*—Karl Group
*Attorney, Agent, or Firm*—Milton M. Peterson

[57] ABSTRACT

A non-melted, non-powder concentrated colorant material consists essentially of a flux that is not over 30% by weight of an alkali metal borate, a binder that is an alkali metal silicate and 35–60% $V_2O_5$. The flux, binder and colorant oxide constitute at least 90% of the composition. A method of producing a black glass-ceramic material comprises forming the colorant material into particles and adding the particles to a precursor glass for the glass-ceramic while the glass is passing through the forehearth of a glass tank in a molten state.

14 Claims, No Drawings

FOREHEARTH COLORANT

FIELD OF THE INVENTION

The field is a concentrated colorant material for introducing a colorant into a glass precursor of a glass-ceramic as the glass flows through a forehearth.

BACKGROUND OF THE INVENTION

A glass-ceramic is a material having at least one crystalline phase thermally developed in a uniform pattern throughout at least a portion of a glass precursor. Glass-ceramics have been known for over 30 years since being described in U.S. Pat. No. 2,920,971 (Stookey). They find application in diverse areas, an area of particular interest being the fabrication of articles used in the preparation and serving of food. Such articles include cookware, bakeware, tableware and flat cooktops.

In general, production of a glass-ceramic material involves three major steps: melting a mixture of raw materials, usually containing a nucleating agent, to produce a glass; forming an article from the glass and cooling the glass below its transformation range; crystallizing ("ceramming") the glass article by an appropriate thermal treatment. The thermal treatment usually involves a nucleating step at a temperature slightly above the transformation range, followed by heating to a somewhat higher temperature to cause crystal growth on the nuclei.

Whether a glass-ceramic is transparent or opaque, color may be imparted to it by incorporating one or more colorants, usually transition metal oxides, in the precursor glass. However, the color in a parent glass may change markedly during the ceramming step. Therefore, the ultimate glass-ceramic color is often not predictable from the initial glass color.

U.S. Pat. No. 5,070,045 (Comte et al.) discloses transparent glass-ceramic plates that exhibit minimal distortion when rapidly crystallized from precursor glass plates. The transmission in the infra-red portion of the spectrum is relatively high compared to that in the visible portion. The predominant crystal phase in the glass-ceramics is $\beta$-quartz solid solution. Their compositions consist essentially, in weight percent, as calculated on the oxide basis, of:

| | | | |
|---|---|---|---|
| $SiO_2$ | 65–70 | $MgO + BaO + SrO$ | 1.1–2.3 |
| $Al_2O_3$ | 18–19.8 | $ZrO_2$ | 1.0–2.5 |
| $Li_2O$ | 2.5–3.8 | $As_2O_3$ | 0–1.5 |
| MgO | 0.55–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.4–1.4 | $\dfrac{2.8\,Li_2O + 1.2\,ZnO}{5.2\,MgO}$ | >1.8 |

The Comte et al. patent discloses use of 0.1–1.0% of a colorant selected from CoO, NiO, $Cr_2O_3$, $Fe_2O_3$, $MnO_2$, and $V_2O_5$. The presence of the latter ($V_2O_5$) is taught to contribute to minimal distortion while giving a black aspect in reflection and a reddish brown tint in transmission.

It is a basic purpose of the present invention to provide an improved means of producing a glass-ceramic material containing $V_2O_5$ as a colorant. A particular purpose is to provide a concentrated colorant material to be added to a glass in a forehearth to accomplish this basic purpose. A specific purpose is to provide a convenient and effective way of producing a glass-ceramic, as taught by the Comte et al. patent, that contains $V_2O_5$ as an ingredient.

The method and equipment used to add a colorant material to a glass in a forehearth is referred to as a forehearth coloring system or a colorcell. Such systems (colorcells) have been in use for at least 30 years. They have been used primarily, however, to impart colors to soda lime glasses, in particular, green or blue colors to soda lime glass bottles. Currently, colorcells are employed to introduce two types of glass colorants: Unmelted concentrated colorant in particulate form and melted color frits. The former is favored in the United States, while the latter is more popular in Europe.

Because vanadium tends to absorb infra-red rays, it is difficult to obtain even heat distribution in a glass melt having a high $V_2O_5$ content. Consequently, our invention is aimed at providing an unmelted concentrated colorant type of material.

SUMMARY OF THE INVENTION

One aspect of our invention resides in a non-melted, non-powder concentrated colorant material consisting essentially of a flux, a binder and a colorant oxide, the flux being not over 30% by weight of an alkali metal borate, the binder being an alkali metal silicate, and the colorant oxide being 35–60% by weight $V_2O_5$, the flux, binder and colorant oxide constituting at least 90% of the concentrated colorant material.

A further aspect is an improved method of producing a black glass-ceramic material, the improvement comprising the steps of mixing powdered materials consisting essentially of up to 30% by weight of an alkali metal borate, 35–60% by weight $V_2O_5$, and an alkali metal silicate binder, forming the mixture into non-melted, non-powder, colorant particles, and adding the particles to a precursor glass for the glass-ceramic while that glass is passing through the forehearth of a glass tank in a molten state.

PRIOR ART

In addition to the patents mentioned in the Background section, attention is also directed to the following United States patents:

U.S. Pat. No. 3,663,245 (Bryson) discloses a forehearth color concentrate comprising a non-smelted, intimate mixture of a flux with one or more colorants. Suitable fluxes are listed as alkali borates, boric acid, alkali phosphates, orthophosphoric acid, alkali silicates, fluosilicic acid, alkali fluorides, alkali salts, alkali hydroxides and mixtures. Suitable color-inducing metals are listed as chromium, copper, iron, cobalt, manganese, vanadium, nickel, uranium, cerium, cerium-titanium, selenium and some rare earth metals.

U.S. Pat. No. 4,211,820 (Cantaloupe et al.) discloses production of essentially transparent glass-ceramic sheet, as for a smoothtop cooking surface, that displays a warm brown coloration. The glass-ceramics consist essentially, on an analyzed basis, of 2.5–4.5% $Li_2O$, 1–2% MgO, 1–2% ZnO, 19.5–21% $Al_2O_3$, 66.5–68% $SiO_2$, 4–5% $TiO_2$ and 0.02–0.2% $V_2O_5$ U.S. Pat. No. 3,408,212 (Dumesnil) discloses low melting oxide glasses consisting essentially of 40–70 mole percent $V_2O_5$, 10–40 mole percent $PbF_2$, and 20–40 mole percent PbO or $Tl_2O$.

DESCRIPTION OF THE INVENTION

It is undesirable to melt a glass batch containing vanadium oxide, except as a dedicated tank is available. Otherwise, a great deal of time must be spent in thoroughly washing the tank before introducing another glass. Even then, contamination by trace amounts of vanadium may occur.

Therefore, it is particularly desirable to use a forehearth colorcell as a means of introducing vanadium into a glass. Washing out a forehearth is relatively easy compared to an entire tank. Also, more than one colored glass can be created simultaneously by employing different colorcells with different forehearths delivering a base glass from a single tank.

In formulating a concentrated colorant material (hereafter, colorant), care must be taken to provide chemical and physical properties required by forehearth coloring technology. The colorant must have a proper density relative to that of the base glass to which it is added. It must have surface tension and viscosity properties that permit uniform flow into the forehearth and proper mixing with the base glass. Particle size must be controlled to facilitate solution, and difficultly soluble materials, such as zirconia, are avoided.

The colorant must be chemically compatible with the base glass to avoid generation of gaseous or solid inclusions which are not readily removed in the forehearth. To this end, gas-generating compounds, such as nitrates, carbonates and sulfates are usually avoided. Finally, electrochemical compatibility must be considered to avoid damage to precious metal elements in a forehearth, such as electrodes, stirrers and wear plates.

In developing a colorant for our purposes, we have focused on an unmelted concentrate in particle form. Such a concentrate is also referred to as a bonded oxide, or forehearth color concentrate, material.

In general, preparation of such a material involves mixing a coloring oxide with a flux and a binder, all in powder form. The powdered mixture is blended, moistened and compressed into a dense mass, preferably in sheet form. The sheet is then broken into particles of desired size. Fine material is removed to avoid dusting. Likewise, large chunks are screened out to minimize problems in combining with the base glass. We prefer to use particles in the size range of 2-8 mm.

Our invention is predicated on our findings relative to colorant mixtures containing vanadium ($V_2O_5$) pentoxide as a colorant oxide. We have found that, if $V_2O_5$ is mixed with an alkali metal silicate binder and an anhydrous alkali metal borate flux in certain proportions, the resulting mixtures can be processed successfully to produce a bonded colorant material for addition to precursor base glasses for transparent glass-ceramics. Glass-ceramic articles thus produced appear black by reflected light.

The colorant thus produced may be added to various transparent glass-ceramic precursor glasses. However, our invention was developed for use in producing transparent, β-quartz glass-ceramics as taught in the earlier-mentioned Comte et. al. patent. Accordingly, use in such base glasses represents our preferred embodiment, and provides the basis for further specific description.

Any of the known alkali metal borates may be used for flux purposes. The term "alkali metal" includes sodium, potassium and lithium. Because of its low cost and ready availability, we prefer anhydrous sodium tetraborate, better known as borax, as a flux. However, the particular flux used will also depend on the base glass composition, and compatibility of that glass with the flux constituents.

Test melts have shown that colorant compositions, containing no sodium tetraborate as a flux, fail to melt at 1300° C. This indicates they would be too refractory for colorant purposes. Therefore, we prefer to have at least 5% by weight borax as a flux in our colorant mixtures. While compositions containing over about 30% borax are quite fluid, they are undesirable for other reasons. These include incompatibility with the base glass and volatilization of borate vapors in the forehearth. It has been observed that high boron content colorants lead to accelerated wear of the forehearth refractories, especially in the superstructure area. Therefore, we avoid over about 30% borax in a colorant composition, and generally prefer not over 20%.

A variety of different materials is available as binders. We prefer sodium silicate because it is generally compatible and readily available. Also, it is frequently available in liquid form, or can be readily mixed with water. Another factor is that the silicate does not generate any gas when it is incorporated in the base glass melt.

Vanadium pentoxide itself will melt at about 690° C. to a relatively fluid liquid. At typical glass-ceramic forehearth temperatures, around 1500° C., vanadium pentoxide is very fluid, and also has an appreciable vapor pressure. As a result, mixtures containing more than about 60 wt % $V_2O_5$ are not desirable. On the other hand, since the final desired vanadium oxide level in the colored glass is about 0.5 wt %, colorants low in vanadium would have to be added at undesirably high rates. Therefore, mixtures with less than about 35 wt % $V_2O_5$ are excluded.

There are at least two drawbacks to addition of colorant material at a high rate. First, filling more than a few percent by weight of room temperature colorant into a glass stream at elevated temperature represents a large and unmanageable thermal load on the forehearth heating system. Second, as the fraction of the colorant material represented by actual colorant decreases, the addition rate of extraneous and sometimes undesirable elements increases. For instance, the glass-ceramic composition will only tolerate a limited amount of additional sodium oxide and boron.

In the interest of simplicity, our colorant preferably embodies only the essential constituents, $V_2O_5$, borax and sodium silicate. However, other constituents may be tolerated to some extent, and may even be desirable depending on the base glass composition. Such other constituents may include known glass formers and modifiers, for example, MgO, ZnO, $TiO_2$ and $Al_2O_3$. The total of such additional constituents should not normally exceed about 10% of the total composition. Preferably, only oxides or silicates are employed to avoid gas evolution.

Our development work has been carried out using colorants in pellet form. The pellets were made using an Eirich TRO4 bench scale pan pelletizer. Dilute sodium silicate solution was sprayed into a blended mixture to assist pellet formation. The pellets were dried, agglomerates crushed, and the material screened to remove fine and coarse fractions.

While we prefer to use pellets, our work has clearly indicated that our colorant may take other non-powder, non-melted forms as well. These include bonded products, compressed briquets and similar particulate forms.

As indicated earlier, a major concern is electrochemical compatibility of a molten colorant and a base glass. Large electrochemical potentials between the melts can lead to formation of gaseous inclusions, and also to attack on precious metal components in the forehearth system. Colorants typically display electrochemical potentials, with respect to the glass-ceramic precursor glass, in the 100-300 millivolt range. Accordingly, our colorants were tested against a base glass, as described in the Comte et al. patent, in a simulated forehearth atmosphere at 1500° C. Potentials ranging from +20 mV to −43 mV were observed.

The invention is further illustrated with reference to the TABLE below. In the TABLE, colorant compositions, both within and outside our invention, are presented in both batch form and calculated oxide form. Both composition forms are given in weight percent. Also shown are density in grams per cubic centimeter (g/cc) and electrochemical potential in millivolts (mV).

TABLE

|  | 1 | 2 | 3 | 4 | 5 | 6 | 7 |
|---|---|---|---|---|---|---|---|
| Batch: |  |  |  |  |  |  |  |
| $V_2O_5$ | 31.6 | 35 | 38.1 | 40.6 | 42.6 | 44.1 | 50.2 |
| Anh. Borax | 0.0 | 33.2 | 62.2 | 0.0 | 25 | 55.9 | 0.0 |
| Sodium Silicate | 68.4 | 31.8 | 0.0 | 59.4 | 32.4 | 0.0 | 49.8 |
| Yield: |  |  |  |  |  |  |  |
| $V_2O_5$ | 31.6 | 35 | 38.1 | 40.6 | 42.6 | 44.1 | 50.2 |
| $Na_2O$ | 15.8 | 17.5 | 19.1 | 14.2 | 15.3 | 17.2 | 11.6 |
| $B_2O_3$ | 0 | 22.9 | 42.8 | 0 | 17.2 | 38.7 | 0 |
| $SiO_2$ | 52.6 | 24.6 | 0 | 45.2 | 24.9 | 0 | 38.2 |
| Density, g/cc | unm. | 2.49 | NA | unm. | 2.53 | 2.55 | unm. |
| Elec. Potential, mV |  |  |  |  |  |  |  |

|  | 8 | 9 | 10 | 11 | 12 | 13 |
|---|---|---|---|---|---|---|
| Batch: |  |  |  |  |  |  |
| $V_2O_5$ | 50.2 | 50.2 | 58 | 50 | 46 | 46 |
| Anh. Borax | 24.9 | 50 | 6 | 10 | 6 | 18 |
| Sodium Silicate | 24.9 | 0.0 | 36 | 40 | 48 | 36 |
| Yield: |  |  |  |  |  |  |
| $V_2O_5$ | 50.2 | 50.2 | 58 | 50 | 46 | 46 |
| $Na_2O$ | 13.6 | 15.3 | 10.3 | 12.4 | 13.1 | 14 |
| $B_2O_3$ | 17.4 | 34.5 | 4.2 | 7 | 4.2 | 12.5 |
| $SiO_2$ | 18.8 | 0 | 27.1 | 30.1 | 36.2 | 27.1 |
| Density, g/cc | 2.62 | 2.64 | 2.79 | 2.6 | 2.59 | 2.53 |
| Elec. Potential, mV |  |  | +20 mV | +5 mV | −43 mV | −27 mV | unm. = unmelted

Examples 1, 4 and 7 illustrate the need for an alkali borate flux. These batches failed to melt when heated to 1300° C. Examples 3, 6 and 9 illustrate the need for an alkali silicate binder. These compositions would be incompatible in a forehearth because of their high $B_2O_3$ content.

We claim:

1. A non-melted, forehearth color concentrate in particle form consisting essentially of a flux, a binder and a colorant oxide, the flux being an alkali metal borate present in an amount sufficient to enable the concentrate to melt at 1300° C., but not over 30% by weight the binder being an alkali metal silicate, and the colorant oxide being 35-60% by weight $V_2O_5$, the flux, binder and colorant oxide constituting at least 90% of the forehearth color concentrate.

2. A forehearth color concentrate in accordance with claim 1 wherein the flux is anhydrous borax.

3. A forehearth color concentrate in accordance with claim 2 wherein the anhydrous borax content is 5 to 20%.

4. A forehearth color concentrate in accordance with claim 1 wherein the binder is sodium silicate.

5. A forehearth color concentrate in accordance with claim 1 which, in addition to the flux, binder and colorant oxide, contains up to 10% of at least one additional oxide or source thereof.

6. A forehearth color concentrate in accordance with claim 1 wherein the forehearth color concentrate is in the form of pellets.

7. A forehearth color concentrate in accordance with claim 1 wherein the forehearth color concentrate is in the form of bodies in the size range of 2-8 mm.

8. In a method of producing a black glass-ceramic material, the improvement comprising the steps of mixing powdered materials consisting essentially of up to 30% by weight of an alkali metal borate, 35-60% $V_2O_5$, and an alkali metal silicate binder, forming the mixture into non-melted, non-powder, colorant particles, and adding the particles to a precursor glass for the glass-ceramic while that glass is passing through the forehearth of a glass tank in a molten state.

9. A method in accordance with claim 8 wherein the alkali metal borate is anhydrous borax.

10. A method in accordance with claim 8 wherein the binder is sodium silicate.

11. A method in accordance with claim 8 wherein the particles are in pellet form.

12. A method in accordance with claim 8 wherein the particles are in the size range of 2-8 mm.

13. A method in accordance with claim 8 that comprises the additional steps of forming a glass article from the glass after the colorant particles are added thereto, and then ceramming the glass article.

14. A method in accordance with claim 8 wherein the colorant particles are added to a glass having a composition consisting essentially, in parts by weight as calculated on the oxide basis, of

| | | | |
|---|---|---|---|
| $SiO_2$ | 65-70 | $MgO + BaO + SrO$ | 1.1-2.3 |
| $Al_2O_3$ | 18-19.8 | $ZrO_2$ | 1.0-2.5 |
| $Li_2O$ | 2.5-3.8 | $As_2O_3$ | 0-1.5 |
| $MgO$ | 0.55-1.5 | $Sb_2O_3$ | 0-1.5 |
| $ZnO$ | 1.2-2.8 | $As_2O_3 + Sb_2O_3$ | 0.5-1.5 |
| $TiO_2$ | 1.8-3.2 | $Na_2O$ | 0-<1.0 |
| $BaO$ | 0-1.4 | $K_2O$ | 0-<1.0 |
| $SrO$ | 0-1.4 | $Na_2O + K_2O$ | 0-<1.0 |
| $BaO + SrO$ | 0.4-1.4 | $2.8 Li_2O + 1.2 ZnO$ | >1.8 |
| | | $5.2 MgO.$ | |

* * * * *